United States Patent
Hall, Jr. et al.

(10) Patent No.: US 11,704,260 B2
(45) Date of Patent: Jul. 18, 2023

(54) MEMORY CONTROLLER

(71) Applicant: Micron Technology, Inc., Boise, ID (US)

(72) Inventors: James A. Hall, Jr., Boise, ID (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 68 days.

(21) Appl. No.: 16/809,791

(22) Filed: Mar. 5, 2020

(65) Prior Publication Data

US 2020/0201793 A1 Jun. 25, 2020

Related U.S. Application Data

(62) Division of application No. 15/623,514, filed on Jun. 15, 2017, now Pat. No. 10,621,117.

(51) Int. Cl.
*G06F 3/06* (2006.01)
*G06F 13/16* (2006.01)

(52) U.S. Cl.
CPC ........ *G06F 13/1668* (2013.01); *G06F 3/0611* (2013.01); *G06F 3/0659* (2013.01); *G06F 3/0683* (2013.01)

(58) Field of Classification Search
CPC .... G06F 3/0611; G06F 3/0604; G06F 3/0659; G06F 3/0683
USPC .................................................. 711/154, 102
See application file for complete search history.

(56) References Cited

U.S. PATENT DOCUMENTS

| | | | |
|---|---|---|---|
| 6,226,724 B1 | 5/2001 | Biggs | |
| 8,688,899 B2 | 4/2014 | Nellans et al. | |
| 9,152,553 B1* | 10/2015 | Shin ...................... | G06F 3/0604 |
| 9,529,708 B2 | 12/2016 | Puthiyedath et al. | |
| 10,026,457 B2 | 7/2018 | Arai et al. | |
| 2002/0184461 A1 | 12/2002 | Zumkehr | |
| 2005/0144375 A1* | 6/2005 | Bains ..................... | G06F 13/161 |
| | | | 711/167 |
| 2006/0217865 A1 | 9/2006 | Sanders | |

(Continued)

FOREIGN PATENT DOCUMENTS

| | | |
|---|---|---|
| GB | 2427721 A | 1/2007 |
| TW | 201432696 A | 8/2014 |

(Continued)

OTHER PUBLICATIONS

Notice of Preliminary Rejection from related Korean patent application No. 10-2019-7033552, dated Jan. 15, 2021, 7 pages.

(Continued)

*Primary Examiner* — Than Nguyen
(74) *Attorney, Agent, or Firm* — Brooks, Cameron & Huebsch, PLLC

(57) ABSTRACT

The present disclosure includes apparatuses and methods related to a memory controller, such as a host memory controller. An example apparatus can include a host memory controller coupled to a first memory device and a second memory device via a channel, wherein the host memory controller is configured to send a first number of commands to the first memory device using a first device select signal, and send a second number of commands to the second memory device using a second device select signal.

16 Claims, 4 Drawing Sheets

(56) References Cited

U.S. PATENT DOCUMENTS

| | | | |
|---|---|---|---|
| 2011/0179240 A1* | 7/2011 | Sukonik | G06F 13/1642 |
| | | | 711/158 |
| 2011/0276974 A1* | 11/2011 | Chung | G06F 13/1689 |
| | | | 711/E12.001 |
| 2012/0311371 A1 | 12/2012 | Shaeffer | |
| 2013/0124904 A1 | 5/2013 | Wang et al. | |
| 2014/0122777 A1 | 5/2014 | Oh et al. | |
| 2014/0286107 A1 | 9/2014 | Ishikawa | |
| 2015/0154129 A1 | 6/2015 | Takemae | |
| 2015/0363259 A1 | 12/2015 | Cudak et al. | |
| 2016/0004469 A1 | 1/2016 | Yun et al. | |
| 2016/0048459 A1 | 2/2016 | Oh et al. | |
| 2016/0179678 A1 | 6/2016 | Camp et al. | |
| 2016/0231930 A1 | 8/2016 | De Santis et al. | |
| 2017/0093400 A1 | 3/2017 | Bains et al. | |
| 2017/0103811 A1 | 4/2017 | Lee | |
| 2017/0160934 A1 | 6/2017 | Park et al. | |
| 2018/0004417 A1 | 1/2018 | Park et al. | |
| 2018/0196711 A1 | 7/2018 | Noro | |

FOREIGN PATENT DOCUMENTS

| | | |
|---|---|---|
| TW | 201611030 A | 3/2016 |
| TW | 201711051 A | 3/2017 |
| TW | 201714182 A | 4/2017 |

OTHER PUBLICATIONS

Search Report from related European application No. 18817539.2, dated Jan. 18, 2021, 7 pages.

Office Action from related Taiwanese patent application No. 107120735, dated Nov. 21, 2018, 13 pp.

International Search Report and Written Opinion from related international application No. PCT/US2018/036988, dated Oct. 1, 2018, 22 pp.

Communication Pursuant to Article 94(3) EPC from related European Patent Application No. 18817539.2, dated Feb. 11, 2022, 4 pages.

* cited by examiner

MEMORY CONTROLLER

PRIORITY INFORMATION

This application is a divisional of U.S. application Ser. No. 15/623,514, filed Jun. 15, 2017, the contents of which are incorporated herein by reference.

TECHNICAL FIELD

The present disclosure relates generally to memory devices, and more particularly, to apparatuses and methods using a memory controller, such as a host memory controller.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
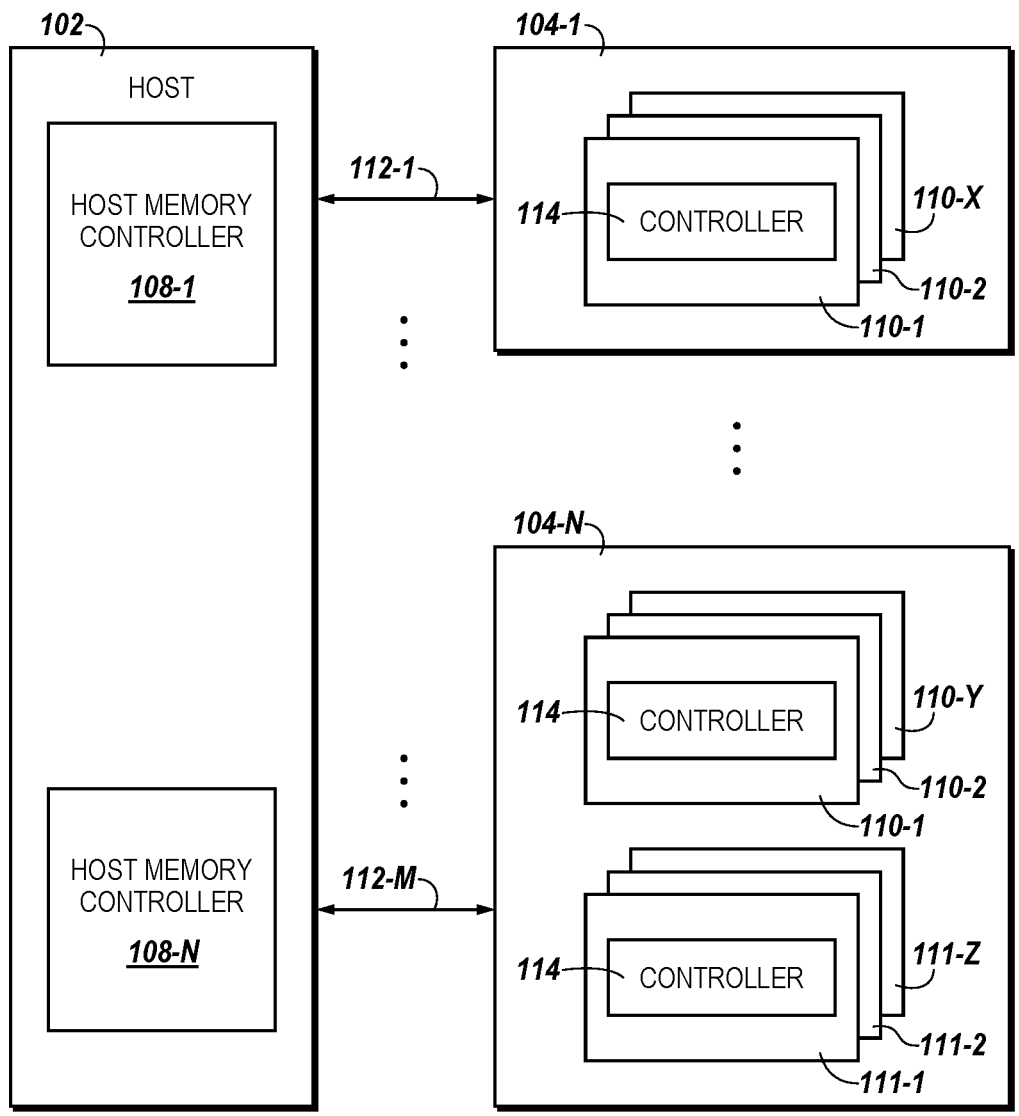
FIG. 1 is a block diagram of an apparatus in the form of a computing system including a memory system in accordance with a number of embodiments of the present disclosure.

The present disclosure includes apparatuses and methods related to a memory controller, such as a host memory controller. An example apparatus can include a host memory controller coupled to a first memory device and a second memory device via a channel, wherein the host memory controller is configured to send a first number of commands to the first memory device using a first device select signal, and send a second number of commands to the second memory device using a second device select signal.

In a number of embodiments, a host including a host processor can be coupled to a number of memory devices via a channel. The number of memory devices can include a number of first memory devices, such as non-volatile memory, and a number of second memory devices, such as volatile memory. The host can select commands for execution on the first and/or second memory devices. Signals associated with commands to be executed on the first and/or second memory devices can be sent to the first and/or second memory devices on a command/address bus shared by the first and second memory devices. The first memory devices can be selected by sending a first device select signal to the first memory devices on a first device select line and then subsequent signals sent on the command/address bus will be sent to the first memory devices. The second memory devices can be selected by sending a second device select signal to the second memory devices on a second device select line and then subsequent signals sent on the command/address bus will be sent to the second memory devices. The device select signals can be used to select memory devices to account for timing parameters associated with the memory devices and/or to account for commands that are support by particular memory devices.

In a number of embodiments, a first command can begin execution by selecting the first memory device using a first device select signal sent on a first device select line and sending signals associated with the first command to the first memory device. Timing parameters associated with a first memory device and a second memory device may allow another command to begin execution on the second memory device while the first memory device is executing the first command. While the first memory device is executing the first command, a second command can begin execution by selecting the second memory device using a second device select signal sent on a second device select line and signals associated with the second command can be sent to the second memory device. The host memory controller can send additional signals for the second command being executed on the second memory device by sending additional device select signals on the second device select line. In another embodiment, the host memory controller can select the first memory device via the first device select line and send additional signals associated with the first command being executed on the first memory device. The host memory controller can control the timing of when to send signals to the memory devices based on timing parameters associated with the memory devices using timers on the host memory controller.

In a number of embodiments, a first command can begin execution by selecting the first memory device using a first device select signal sent on a first device select line and sending signals associated with the first command to the first memory device. The signals associated with the first command can be supported by the first memory device, but may not be supported by the second memory device. The device select signals sent to the memory devices on the device select lines to select which memory devices will receive signals can be used to send commands to memory devices that support the commands being sent. A second memory device can be selected via a device select signal sent to the second memory device via a second device select line. Signals associated with a command to be executed on the second memory device can be sent to the second memory device. The signals can be supported by the second memory device, but may not be supported by the first memory device. The host memory controller can control which memory devices will receive signals using state machines on the host memory controller.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M", "N", "S", "T", "X", "Y", and "Z" indicate that a number of the particular feature so designated can be included with a number of embodiments of the present disclosure.

As used herein, "a number of" something can refer to one or more of such things. For example, a number of memory devices can refer to one or more of memory devices. Additionally, designators such as "M", "N", "S", "T", "X", "Y", and "Z", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 308 in FIG. 3. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a functional block diagram of a computing system including an apparatus in the form of a number of memory systems 104-1 ... 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, memory systems 104-1 ... 104-N can include a one or more memory devices, such as memory devices 110-1, ..., 110-X, 110-Y and memory devices 111-1, ..., 111-Z. Memory devices 110-1, ..., 110-X, 110-Y and memory devices 111-1, ..., 111-Z can include volatile memory and/or non-volatile memory. For example, memory devices 110-1, ..., 110-X, 110-Y can be non-volatile RRAM memory and memory devices 111-1, ..., 111-Z can be DRAM memory. In FIG. 1, memory system 104-1 is coupled to the host via channel 112-1 can include memory devices 110-1, ..., 110-X. In this example, each memory device 110-1, ..., 110-X, 110-Y and 111-1, ..., 111-Z includes a controller 114. Controller 114 can receive commands from host 102 and control execution of the commands on a memory device. Memory devices 110-1, ..., 110-X, 110-Y and 111-1, ..., 111-Z can also include memory device that do not include a controller on the memory device (e.g., onboard), such as discreet memory devices, for example.

As illustrated in FIG. 1, a host 102 can be coupled to memory systems 104-1 ... 104-N. In a number of embodiments, each memory system 104-1 ... 104-N can be coupled to host 102 via a channel. In FIG. 1A, memory system 104-1 is coupled to host 102 via channel 112-1 and memory system 104-N is coupled to host 102 via channel 112-N. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 includes a controller, e.g., host memory controllers 108-1, ..., 108-N, to communicate with memory systems 104-1 ... 104-N. The controller can be located on the host and/or on another portion of the memory system. The host memory controller 108 can send commands to memory devices 110-1, ..., 110-X, 110-Y and memory devices 111-1, ..., 111-Z via channels 112-1 ... 112-N. The host memory controller 108 can communicate with the memory devices 110-1, ..., 110-X, 110-Y and memory devices 111-1, ..., 111-Z and/or the controller 114 on each of the memory devices 110-1, ..., 110-X, 110-Y and memory devices 111-1, ..., 111-Z to read, write, and erase data, among other operations. A physical host interface can provide an interface for passing control, address, data, and other signals between the memory systems 104-1 ... 104-N and host 102 having compatible receptors for the physical host interface. The signals can be communicated between 102 and memory devices 110-1, ..., 110-X, 110-Y and memory devices 111-1, ..., 111-Z on a number of buses, such as a data bus and/or an address bus, for example, via channels 112-1 ... 112-N.

In a number of embodiments, a host memory controller can use a first address range to address memory devices 110-1, ..., 110-X, 110-Y and a second address range to address memory device 111-1, ..., 111-Z. Each memory device can be accessed directly by the host processor 108, where a first address set (e.g., 0xAA..AA-0xBB..BB) can be used to access memory devices 110-1, ..., 110-X, 110-Y and a second address set (e.g., 0xCC..CC-0xDD..DD) can be used to access memory devices 111-1, ..., 111-Z, for example.

In a number of embodiments, memory devices 110-1, ..., 110-Y can be the main memory for memory system 104-N and memory devices 111-1, ..., 111-Z can be cache for memory system 104-N. The host processor 108 can access memory devices 110-1, ..., 110-Y using an address set (e.g., 0xAA..AA-0xDD..DD) and the host processor 108 can include tag information for data in the cache, memory devices 111-1, ..., 111-Z, to locate and/or store data in the cache. The tag information for the cache can also be stored in other memory devices, such as memory devices 110-1, ..., 110-X and/or 111-1, ..., 111-Z.

In a number of embodiments, a first portion of memory devices 110-1, ..., 110-Y can be access using a first address set (e.g., 0xAA..AA-0xBB..BB) and a first portion of memory devices 111-1, ..., 111-Z can be accessed using a second address set (e.g., 0xCC..CC-0xDD..DD), for example. In a number of embodiments, a second portion of memory devices 110-1, ..., 110-Y can be accessed using a third address set (e.g., 0xEE..EE-0xFF..FF) and a second portion of memory devices 110-1, . . . , 111-Z can be cache for the second portion of memory devices memory devices 110-1, . . . , 110-X, 110-Y.

In a number of embodiments, the host memory controller 108 can control execution of commands by giving priority to commands that are to be executed on particular memory devices 110-1, . . . , 110-X, 110-Y and 111-1, . . . , 111-Z based on the type of memory device. The host memory controller 108 can give priority to commands based on the address set of the commands, where commands with addresses in the first address set associated with particular memory device may be given priority over commands with addresses in the a second address set associated with a different memory device. The priority assigned to the commands can be changed based on a number of commands in a command queue and types of commands in a command queue. The priority assignments can be programmed as the memory devices are being started and they are not changed until the memory devices are shut down and started again. Also, the priority assignments can be changed while the memory device are being operated based on the number and types of commands that the host is sending to the memory devices. In a number of embodiments, priority assignments can be modified based on the applications that are being serviced by the host memory controller.

Memory controllers, such as host memory controller 108 and/or controller 114 on a memory device, can include control circuitry, e.g., hardware, firmware, and/or software. In one or more embodiments, the host memory controller 108 and/or controller 114 on a memory device can be an application specific integrated circuit (ASIC) coupled to a printed circuit board including a physical interface.

Memory devices 110-1, . . . , 110-X, 110-Y and memory devices 111-1, . . . , 111-Z can provide main memory for the memory system or could be used as additional memory or storage throughout the memory system. Each memory device 110-1, . . . , 110-X, 110-Y and memory device 111-1, . . . , 111-Z can include one or more arrays of memory cells, e.g., non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1 can include additional circuitry that is not illustrated so as not to obscure embodiments of the present disclosure. For example, the memory systems 104-1 . . . 104-N can include address circuitry to latch address signals provided over I/O connections through I/O circuitry. Address signals can be received and decoded by a row decoder and a column decoder to access the memory devices 110-1, . . . , 110-X, 110-Y and memory devices 111-1, . . . , 111-Z. It will be appreciated by those skilled in the art that the number of address input connections can depend on the density and architecture of the memory devices 110-1, . . . , 110-X, 110-Y and memory devices 111-1, . . . , 111-Z. In a number of embodiments, memory devices 110-1, . . . , 110-X, 110-Y can have storage densities that are different than the storage density of memory devices 111-1, . . . , 111-Z. Also, memory devices 110-1, . . . , 110-X, 110-Y can use a different number of address signals than memory devices 111-1, . . . , 111-Z.

Figure 2:
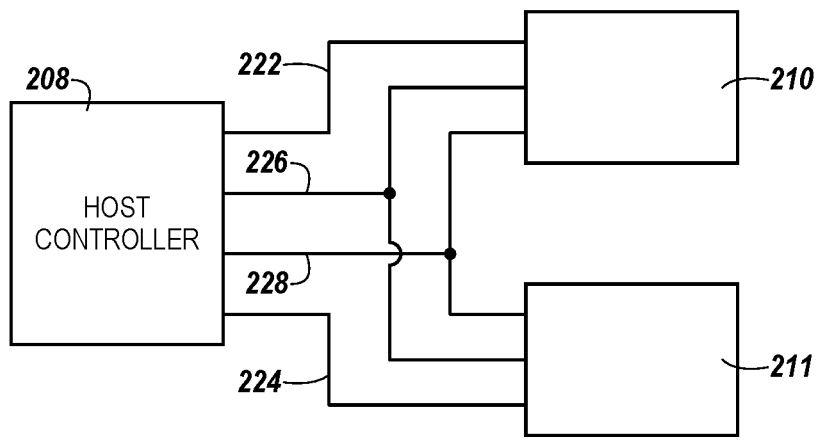
FIG. 2 is a block diagram of an apparatus in the form of a computing system including a host memory controller coupled to memory devices according to embodiments of the present disclosure.

FIG. 2 is a block diagram of an apparatus in the form of a computing system including a host memory controller coupled to memory devices according to embodiments of the present disclosure. In FIG. 2, host memory controller 208 is coupled to a first memory device 210 via data bus 226, command/address bus 228, and a first device select line 222. Host memory controller 208 is coupled to a second memory device 211 via data bus 226, command/address bus 228, and a second device select line 224. Host memory controller can select memory device 210 by sending a device select signal to memory device 210 via device select line 222. Host memory controller can select memory device 211 by sending a device select signal to memory device 211 via device select line 224

Figure 3:
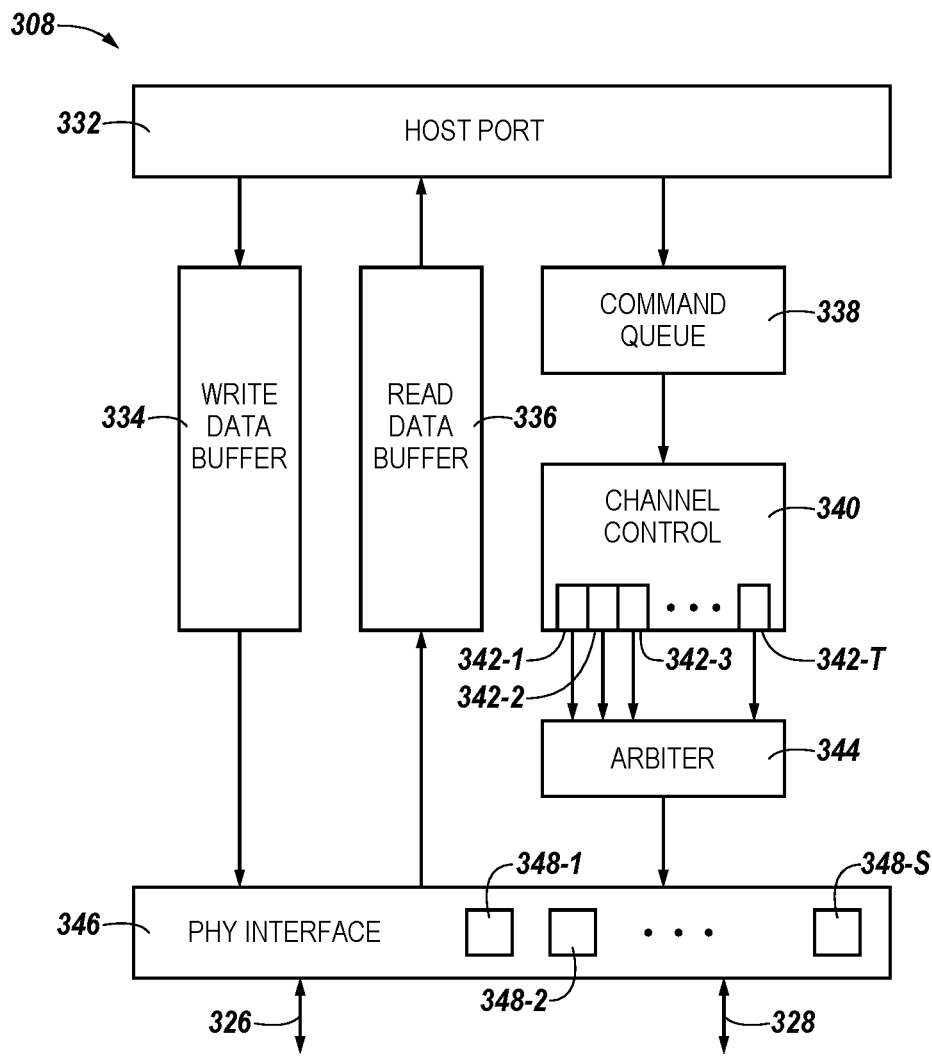
FIG. 3 is a block diagram of an apparatus in the form of a host memory controller according to embodiments of the present disclosure.

FIG. 3 is a block diagram of an apparatus in the form of a host memory controller according to embodiments of the present disclosure. In FIG. 3, host memory controller 308 includes host port 332, which can be coupled to a host processor. Host port 332 can receive commands from a host processor and place them in command queue 338. Commands from command queue 338 can be sent to memory devices via channel control 340. Channel control 340 can include state machines 342-1, . . . , 342-T. Commands can be selected for execution on a set of the state machines 342-1, . . . , 342-T. Particular sets of state machines 342-1, 342-T can be associated with particular memory devices. For example, a first set of state machines 342-1, . . . , 342-T can be used to execute commands on a first memory device (e.g., memory device 110-1 in FIG. 1) and a second set of state machines 342-1, . . . , 342-T can be used to execute commands on a second memory device (e.g., memory device 111-1 in FIG. 1).

The commands can be sent from state machines 342-1, . . . , 342-T to the memory devices via arbiter 344 and physical interface 346 of the host memory controller 308. Physical interface 346 can include timers 348-1, . . . , 348-S. Particular sets of timers 348-1, . . . , 348-S can be associated with particular memory devices. For example, a first set of timers 348-1, . . . , 348-S can be used to control the timing of commands on a first memory device (e.g., memory device 110-1 in FIG. 1) and a second set of timers 348-1, . . . , 348-S can be used to control the timing of commands on a second memory device (e.g., memory device 111-1 in FIG. 1). The first memory device may have different timing parameters than the second memory device, therefore timers 348-1, . . . , 348-S can be configured to include a number of timing parameters that control the timing of commands on a different memory devices. The commands from the host memory controller 308 can be sent to memory devices via data bus 326 and/or command/address bus 328. Data associated with the commands can be stored in write data buffer 334 on the controller and sent from the host to memory devices via data bus 326. Also, data associated with the commands can be received at the host from memory devices via data bus 326 and stored in read data buffer 336.

Figure 4A:
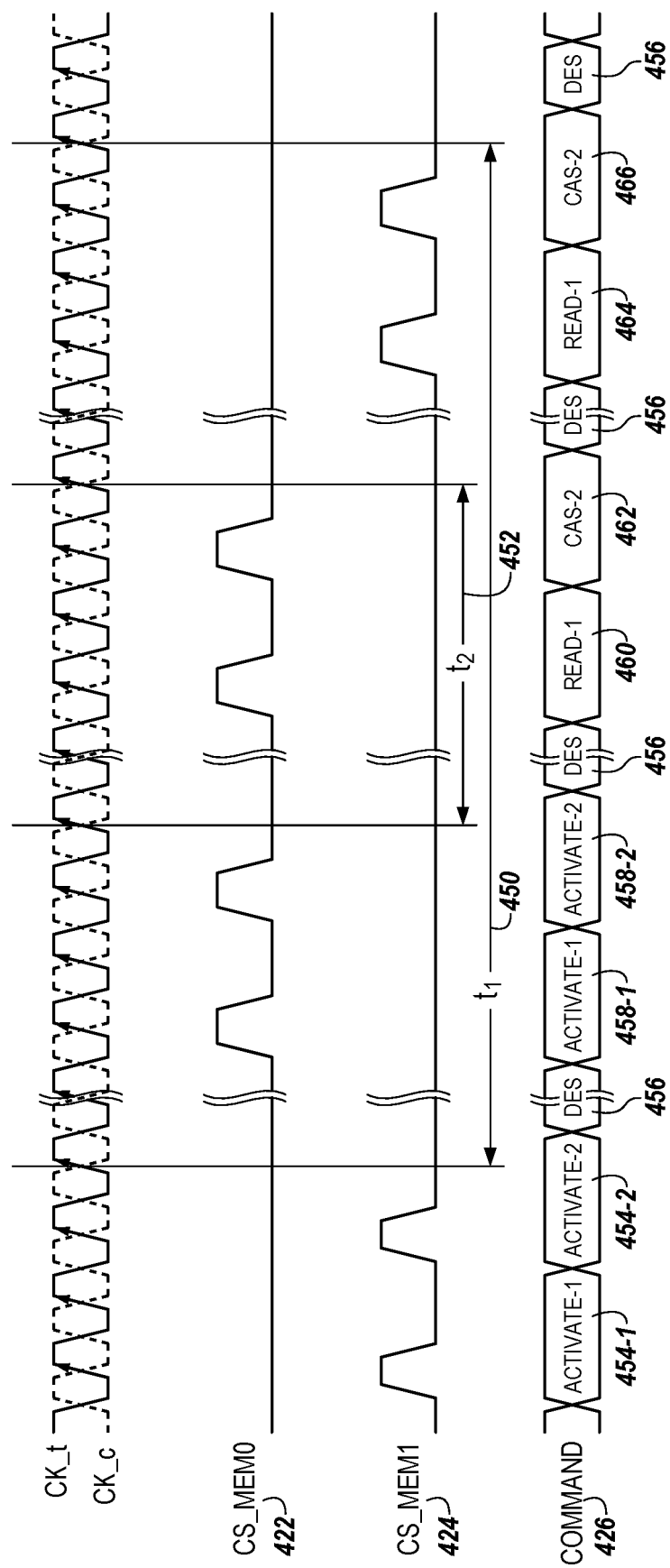
FIGS. 4A and 4B are timing diagrams for commands and signals sent by a host memory controller in accordance with a number of embodiments of the present disclosure.
Figure 4B:
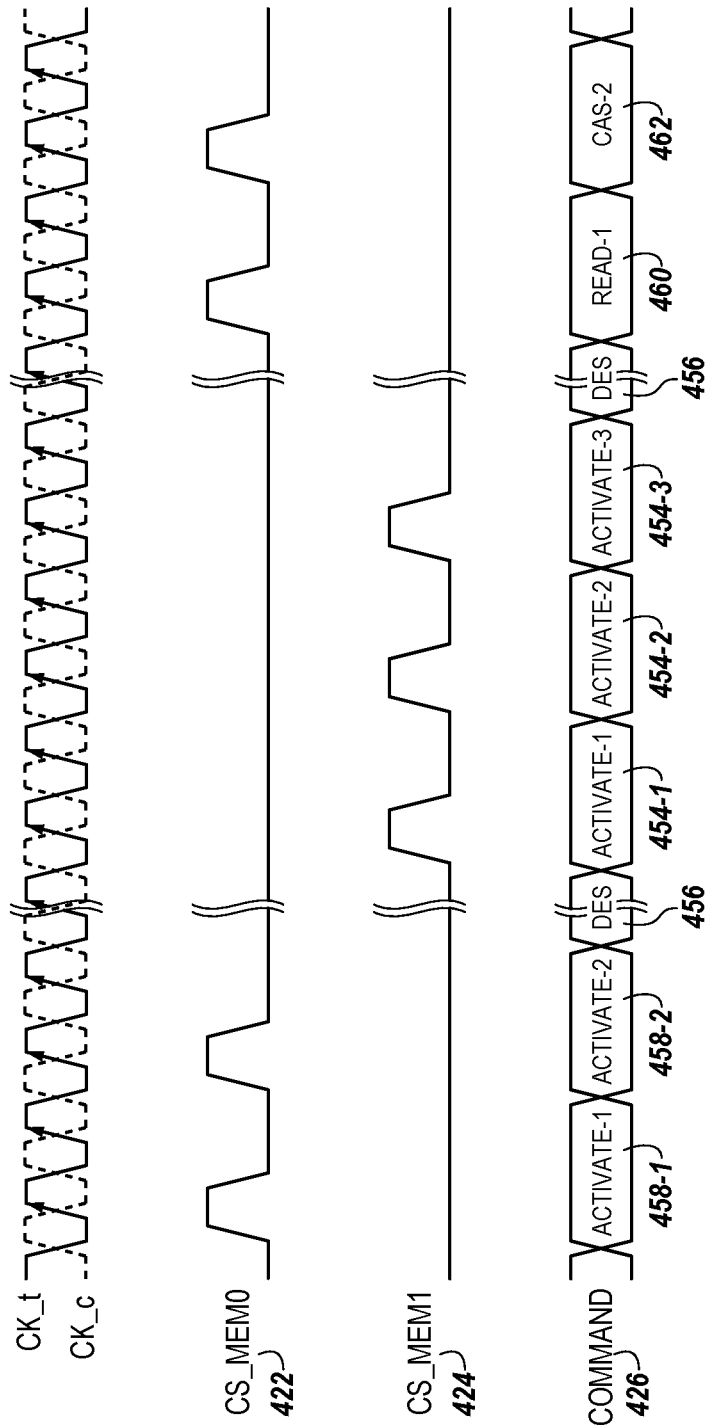

FIGS. 4A and 4B are timing diagrams for commands and signals sent by a host memory controller in accordance with a number of embodiments of the present disclosure. In FIG. 4A, a host memory controller can send signals to a first memory device (e.g., memory device 110-1 in FIG. 1) and/or a second memory device (e.g., memory device 111-1 in FIG. 1) based on the timing parameters associated with memory devices. Device select signals can be sent to a first memory device via device select line 424, along with activate commands 454-1 and 454-2. The device select signals sent can indicate that activate commands 454-1 and 454-2 are for the first memory device(s) coupled to the host via device select line 424. The timing parameters associated with the performing commands on the first device can include an activate to read time ($t_1$) 450 that allows for another command to be activated and/or executed on the second memory device during activate to read time 450.

The host memory controller can start execution of a command on a second memory device by sending device select signals to a second memory device via device select line 422, along with activate commands 458-1 and 458-2. The execution of the command on the second memory device can occur right after the activate commands 454-1 and 454-2 or after a period of time, as indicated by deselect signal 456. Activate to read time ($t_2$) 452 for the second memory device is such that the second memory device will be ready to continue execution of the command before the first memory device will be ready to continue execution of its command, therefore device select signals can be sent to the second memory device along with device command signal 460 and address signal 462 on command bus 426 for the second memory device command. The execution of the command on the second memory device can continue right after the activate commands 458-1 and 458-2 or after a period of time, as indicated by deselect signal 456.

During the time where activate commands 458-1 and 458-2, command signal 460, and address signal 462 were sent to the second memory device, the first memory device is nearing the end of activate to read time ($t_1$) 450. The host memory controller can continue execution of a command on the first memory device by sending device select signals can be sent to the first memory device along with command signal 464 and address signal 466 to the first memory device on command bus 426. The execution of the command on the first memory device can continue right after device command signal 460 and address signal 462 or after a period of time, as indicated by deselect signal 456.

In FIG. 4B, a host memory controller can send signals to a first memory device (e.g., memory device 110-1 in FIG. 1) and/or a second memory device (e.g., memory device 111-1 in FIG. 1) based on the type of commands that the memory devices supported by the memory devices. For example, a first memory device may not support a command that is supported by a second memory device. The device select signals sent to the memory devices via device select lines can be used to select the device that will receive commands supported by the selected memory device.

In FIG. 4B, device select signals can be sent to a first memory device via device select line 422, along with activate commands 458-1 and 458-2. The device select signals sent can indicate that activate commands 458-1 and 458-2 are for the first memory device(s) coupled to the host via device select line 422. The first memory device can be configured to support activate commands 458-1 and 458-2.

The host memory controller can start execution of a command on a second memory device by sending device select signals to a second memory device via device select line 424, along with activate commands 454-1, 454-2, and 454-3. The execution of the command on the second memory device can continue right after activate signals 458-1 and 458-2 or after a period of time, as indicated by deselect signal 456. The command being executed on the second memory device may include activate commands 454-1, 454-2, and 454-3, which might not be supported by the first memory device. The device select signals sent to the second memory device via select line 424 can select the second device for receiving activate commands 454-1, 454-2, and 454-3, which are supported by the second memory device.

The command selected for execution by the host on the first memory device can continue after sending activate commands 454-1, 454-2, and 454-3 to the second memory device. The host memory controller can continue execution of the command on the first memory device by sending device select signals to the first memory device via device select line 422 to select the first memory device for receiving command signal 460 and address signal 462 via command bus 426. The execution of the command on the first memory device can continue right after activate signals 458-1, 458-2 and 458-3 or after a period of time, as indicated by deselect signal 456.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a first memory device configured to support a first type of command;
a second memory device configured to support a second type of command; and
a host memory controller coupled to the first memory device and the second memory device via a channel, wherein the controller is configured to:
receive a first command of the first type of command;
select the first memory device that supports the first command;
select the first command for execution on the first memory device based on receiving the first type of command, wherein the first memory device is mapped to a range of addresses by the host memory controller and the second memory device acts as cache for the first memory device;
send a device select signal to the first memory device in response to selecting the first command for execution on the first memory device; and
send the first command to the first memory device.

2. The apparatus of claim 1, wherein the first command is selected for execution on the first memory device by a state machine on the host memory controller.

3. The apparatus of claim 1, wherein the first command is sent to the first memory device using a first device select line in response to a state machine selecting the first memory device for executing of the first command.

4. The apparatus of claim 1, wherein the first command is not executable by second memory device.

5. The apparatus of claim 1, wherein the first command is sent to the first memory device along with other commands of the first type of command based on timing parameters associated with the first memory device and timing parameters associated with the second memory device.

6. A method, comprising:
receiving a first number of commands of a first type of command and a second number of commands of a second type of command;
selecting a first memory device that supports the first type of command;
selecting the first number of commands for execution on the first memory device based on receiving the first type of command;
sending the first number of commands to the first memory device in response to sending the first device select signal;
selecting a second memory device that supports the first type of command;
selecting the second number of commands for execution on the second memory device based on receiving the second type of command;
sending a second device select signal to the second memory device in response to selecting the second number of commands for execution on the second memory device; and
prior to the first number of commands being executed by the first memory device, sending the second number of commands to the second memory device using the second device select signal.

7. The method of claim 6, further including sending the second number of commands to the second memory device based on timing parameters of the first memory device.

8. The method of claim 6, further including sending a third number of commands of the first type of command to the first memory device based on timing parameters of the first memory device.

9. The method of claim 6, wherein sending the first number of commands to the first memory device includes sending a portion of the first number of commands that are not executable by the second memory device.

10. An apparatus, comprising:
a host memory controller coupled to a first memory device and a second memory device via a channel, wherein the first memory device supports a first type of command and the second memory device supports a second type of command, wherein the first memory device is mapped to a range of addresses by the host memory controller and the second memory device acts as cache for the first memory device, and wherein the host memory controller is configured to:
receive a first number of commands of the first type of command and a second number of commands of the second type of command;
select the first memory device that supports the first number of commands of the first type of command;
select the first number of commands for execution on the first memory device based on receiving the first type of command;
send a first device select signal to the first memory device in response to selecting the first number of commands for execution on the first memory device;
send the first number of commands to the first memory device using the first device select signal;
select the second number of commands for execution on the second memory device based on receiving the second type of command;
send a second device select signal to the second memory device in response to selecting the second number of commands for execution on the second memory device; and
send the second number of commands to the second memory device using the second device select signal.

11. The apparatus of claim 10, wherein the channel includes data lines and command lines that couple the host memory controller to the first memory device and the second memory device.

12. The apparatus of claim 10, wherein the channel includes a first device select line that couples the host memory controller to the first memory device.

13. The apparatus of claim 10, wherein the channel includes a second device select line that couples the host memory controller to the second memory device.

14. The apparatus of claim 10, wherein the first number of commands are sent to the first memory device on commands lines shared by the first memory device and the second memory device in response the host memory controller sending the first device select signal.

15. The apparatus of claim 10, wherein the second number of commands are sent to the second memory device on commands lines shared by the first memory device and the second memory device in response the host memory controller sending the second device select signal based on timing parameters associated with the second memory device.

16. The apparatus of claim 15, wherein the first memory device is volatile memory and the second memory device is non-volatile memory.

* * * * *